Patented Feb. 7, 1933

1,896,263

UNITED STATES PATENT OFFICE

PARKE H. WATKINS, OF NAUGATUCK, CONNECTICUT, ASSIGNOR TO THE NAUGATUCK CHEMICAL COMPANY, OF NAUGATUCK, CONNECTICUT, A CORPORATION OF CONNECTICUT

RUBBER COATED ARTICLES AND PROCESS

No Drawing. Application filed September 19, 1928, Serial No. 307,062. Renewed August 13, 1931.

This invention relates to rubber coated articles and the process of making the same.

Heretofore in coating metal or wood or concrete articles it has been customary to apply hard rubber and intermediate rubber cements to the surface of the articles and to dry the cements in succession as they are applied. Such preliminary coats of rubber provide a bond between the material being coated and a subsequent sheet of rubber which is applied over the dried cements and which forms a major portion of the rubber coating. This method is a difficult one to carry out, requires much skilled labor, and very often the method results in an unsatisfactory product in which rubber coating will often strip off. Furthermore the preparation of the sheet of rubber requires the usual steps of washing, mixing, milling and calendering the stock.

It is the object of my invention to provide a novel method of coating articles of metal or wood or cement with rubber, the technique of which is such as not to require skilled labor and which can be more economically carried out than the methods of coating such objects heretofore employed. It is also an object of my invention to provide a novel process for coating objects which gives a more permanent coat of rubber than heretofore obtained, thereby resulting in an improved article.

Without intending to impose limitations more than required by the prior art my invention broadly stated consists in coating the article of metal, cement or wood with the usual basic hard rubber cement, the usual intermediate rubber cement and finally applying a coat of rubber over the intermediate rubber, which last coat may be deposited from a water dispersion of rubber such as latex either compounded or uncompounded, or a water dispersion of rubber made in a Werner-Pfleiderer mixer; and the novel product thereby obtained.

One of the preferred methods of carrying out my novel process as applied to coating iron with rubber, is to first thoroughly clean the iron article by sanding, and, if of metal or concrete, treating with a cleansing solution such as concentrated sulphuric acid containing a small percentage of potassium dichromate which cleansing solution is thoroughly washed from the surface of the article and the article dried. The cleaned and dried article is then coated with a basic hard rubber cement of the following composition.

| | Parts by weight |
|---|---|
| Smoked sheet rubber | 50 |
| Spray dried latex | 50 |
| Zinc oxide | 75 |
| Lime | 10 |
| Magnesium oxide | 75 |
| Tetramethylthiuramdisulphide (accelerator) | 10 |
| Dibenzylamine | 10 |
| Sulphur | 60 |
| Aluminum powder | 25 |
| Phthalic anhydride | .25 |
| Acetaldehyde aniline condensation product (anti-oxidant) | 3 |
| | Cc. per gallon |
| Carbon bisulphide | 10 |

The acetalydehyde-aniline condensation product herein used as an antioxidant is that product which has been prepared in a strongly acid solution.

Two pounds of the above compound thoroughly mixed and broken down on the mill are mixed with one gallon of solvent naphtha or any other suitable solvent such as gasoline or carbon tetrachloride. In coating the clean and dry article with the basic hard rubber cement, it is preferably dipped in the cement although the cement may be applied by brushing or spraying or otherwise as desired. The coating of hard rubber cement is dried either at ordinary temperatures or at elevated temperatures as may be desired and successive coats of the hard rubber cement may be applied and dried as desired.

Over the coat of hard rubber applied as above directed, a coat of intermediate rubber cement which is of a somewhat softer nature than the first coat of hard rubber cement and serves as a bond between the hard rubber cement and the rubber to be applied as later described, is applied. This intermediate rubber cement is composed of

| | Parts by weight |
|---|---|
| Smoked sheet rubber | 50 |
| Spray dried latex | 50 |
| Zinc oxide | 75 |
| Lime | 10 |
| Dibenzylamine | 10 |
| Sulphur | 60 |
| Phthalic anhydride | .25 |
| Acetaldehyde aniline condensation product (anti-oxidant) | 3 |

| | Cc. per gallon |
|---|---|
| Carbon bisulphide | 10 |

Two pounds of the above compound thoroughly mixed and broken down on the mill are mixed with one gallon of solvent naphtha or any other suitable solvent such as gasoline or carbon tetrachloride. This intermediate rubber cement may be applied by dipping, brushing or spraying as convenient and after application is dried either at ordinary or at elevated temperatures. As many coats of the intermediate rubber cement as may be desired are applied and dried.

The iron surface thus coated with the hard rubber and intermediate rubber is then coated with the final layer of rubber preferably by immersing the surface in a water dispersion of rubber the following being an example of the use of a compounded rubber latex as the dispersion:—

| | Parts by weight |
|---|---|
| Rubber (as latex twice creamed with pectin and diluted to 35% solids) | 100 |
| Zinc oxide | 10 |
| Nekal | 1 |
| Talc | 13 |
| Ammonium thiocyanate | 0.1 |
| Glue | 1 |
| Sulphur | 2.7 |
| Heptaldehyde - aniline condensation product | 2 |
| Carbon black | 5 |

The solids of the above formula may be emulsified and added to the creamed latex and sufficient water added to the mixture to bring the total solid content to approximately 35%.

Another formula is:

| | Parts by weight |
|---|---|
| Rubber (as latex twice creamed with alginate, semicured, and diluted to 35% solids) | 100 |
| Zinc oxide | 2 |
| Carbon black | 3 |
| Sulphur | 7.5 |
| Ammonium thiocyanate | .1 |
| Nekal | 1 |

| | Cc. per 100 cc. mixture |
|---|---|
| Sodium polysulphide | .4 |

The solids of the above formula are added to the latex and a sufficient amount of water added to reduce the concentration to approximately 35% total solids.

In the above formulæ the nekal is a condensation product of an aromatic hydrocarbon with an aliphatic alcohol in the presence of sulphuric acid and acts as a preservative of latex to prevent premature coagulation and also serves to increase the penetrating power of the latex. The condensation product of heptaldehyde and aniline is an accelerator.

The water dispersion of rubber and compounding ingredients may not only contain the above mentioned constituents but if so desired suitable coloring agents and fillers which resist the action of abrasion or of corrosive agents may be added as desired. The rubber of the above composition may be either in the form of creamed or uncreamed latex, vulcanized, unvulcanized or partially vulcanized latex, or of a water dispersion of rubber formed by emulsifying rubber in a Werner-Pfleiderer mill. Other methods of applying the water dispersion of rubber and compounding ingredients may be employed such as brushing or spraying the dispersion on the surface to be coated.

The article, after immersion, is withdrawn from the dispersion and allowed to drain and run smooth and thereafter dipped in a 50% solution of acetic acid and alcohol which serves to coagulate the solid constituents of the dispersion and cause their deposition on the surface of the article. Other methods of causing coagulation may be by subjecting the film of dispersion to the action of heat or of coagulating vapors.

The thickness of rubber deposited from the water dispersion is determined by the length of time in which the article is immersed in the dispersion and may be as much as $\frac{1}{16}$ to $\frac{1}{8}''$ in thickness. If desired a thicker coat may be obtained by repeating the dipping and coagulating steps above outlined.

After coagulation, the surface of the deposited rubber is thoroughly washed with water, dried, and cured.

The coat of rubber obtained by following the above process is a much more durable one than that obtained by applying a milled sheet of rubber to a cemented surface inasmuch as the adhesion between the rubber deposited from the dispersion and the intermediate rubber is greater. Furthermore the steps of the above-mentioned process may be carried out without the aid of skilled labor and largely by the use of automatic or semi-automatic machinery which makes the process an economical one.

Many objects such as exhaust fans, housings, pipes, open and closed head metal drums, metal parts for refrigerators, brake bands, electrodes, cleaning racks, castings of various shapes, perforated sheet metal plates, wires, bowls, tumbling barrels, etc. have been coated successfully by this process.

In another preferred method of carrying out my novel process, especially applicable to hollow articles such as pipes, I first sand blast the pipe to clean it. Bolt holes in the flanges of the pipe are then stopped up and strips of sheet metal are secured about the peripheries of the flanges in order to form cups at the ends of the pipe. The pipe is then stood on end over an aperture in a table and a cleaning solution such as concentrated sulphuric acid containing a small percentage of potassium dichromate is pumped into the pipe to clean it. The cleaning solution is then drained from the pipe and the pipe thoroughly washed out and dried. After the pipe is dry a solution of hard rubber cement of a composition such as previously given is pumped or forced into the pipe in any suitable manner, drained therefrom and the resulting film of cement dried. This step may be repeated in order to give successive coats of the hard rubber if desired. Over the hard rubber a coat of intermediate rubber is applied by pumping intermediate rubber cement of the composition such as before given into the pipe, draining the cement therefrom and drying the resulting film, and this operation may be repeated to provide as many films of the intermediate rubber as desired. The final coat of rubber is applied over the intermediate rubber by pumping a water emulsion of rubber and compounding ingredients of a composition such as before given, into the pipe, draining the dispersion from the pipe, pumping a coagulating medium such as a 50% solution of acetic acid and alcohol into the pipe and draining the coagulating medium from the pipe. The coagulating medium causes the deposition of the solid constituents of the film of dispersion over the intermediate rubber. If necessary the resulting coat of rubber may be dried somewhat to remove any excess of the coagulating medium. The water dispersion of rubber and compounding ingredients may then be pumped back into the pipe and allowed to stand for a length of time necessary to allow for the formation of a deposit of rubber of the desired thickness. This deposit of rubber from the water emulsion of rubber and compounding ingredients is effected by the action of the coagulating medium adsorbed in the first coat of rubber deposited by the coagulating process which adsorbed coagulating medium diffuses into the adjacent water dispersion of rubber and compounding ingredients and causes the deposition of the solid constituents of the water dispersion. This action continues so long as the water dispersion is allowed to remain in the pipe, up to a certain limit determined by the amount of adsorbed coagulating medium present, so that the thickness of the deposit is effectively controlled by the length of time for which the dispersion is allowed to remain in the pipe. At the end of a period of time necessary to form the deposit of the required thickness the dispersion of rubber and compounding ingredients is emptied from the pipe. The coagulating solution may be passed through the pipe again, followed by a thorough washing with water, and the coat of rubber finally dried either at ordinary or elevated temperatures. The coat of rubber may be vulcanized by passing steam into the pipe at 40 pounds pressure for 40 minutes or at any suitable steam pressure for any suitable length of time as determined by the vulcanizing ingredients incorporated in the rubber.

The advantage of this second method of coating iron with rubber is that the solutions from which the various coats of rubber are applied may be kept in vats and pumped into various hollow objects as desired, the operation not requiring skilled labor and being effectively performed very largely by machinery thus making the process an economical one.

The above process may be applied to other metals than iron and to wood and cement in which case the basic cement may be varied somewhat in composition such as indicated by the following formulæ for the basic rubber cement used for coating (1) copper or brass and (2) aluminum.

|  | (1) | (2) |
|---|---|---|
| Smoked sheet rubber | 50 | 50 |
| Spray dried latex | 50 | 50 |
| Zinc oxide | 75 | 75 |
| Magnesium oxide | 75 | 75 |
| Lime | 10 | 10 |
| Tetramethylthiuramdisulphide | 10 | 10 |
| Dibenzylamine | 10 | 10 |
| Sulphur | 48 | 60 |
| Golden antimony | 74.1 | |
| Powdered iron | | 72 |
| Phthalic anhydride | .25 | .25 |
| Acetaldehyde aniline condensation product (anti-oxidant) | 3 | 3 |
| Carbon bisulphide | 10 c.c. per gal. | 10 c.c. per gal. |

Two pounds of the above compound thoroughly mixed and broken down on the mill are mixed with one gallon of solvent naphtha or any other suitable solvent such as gasoline or carbon tetrachloride.

While I have described certain preferred methods of carrying out my invention and the article obtained thereby, it is not intended to limit my invention thereto inasmuch as these only serve to exemplify the broad idea of my invention, the scope of which is such as to comprehend the use of other compounding ingredients in the formulæ above given and to cover variations in the processes disclosed such as will occur to one skilled in the art and for an understanding of the scope of my invention reference should be had to the following claims.

Having thus described my invention what

I claim and desire to protect by Letters Patent is:

1. The process of permanently coating articles with compounded rubber which comprises applying a coating of hard rubber compound to a surface of the article, applying a coating of an intermediate rubber compound over the same, coating the article with a water dispersion of rubber to form a film of the dispersion over the intermediate rubber, depositing solids from said film, and vulcanizing.

2. The process of permanently coating articles with compounded rubber which comprises applying a coating of hard rubber compound to a surface of the article, applying a coating of intermediate rubber compound over the same, applying a water dispersion of rubber and compounding ingredients over the intermediate rubber, coagulating the dispersion to cause the deposition of solid constituents of the dispersion on the article, and vulcanizing.

3. The process of permanently coating articles with compounded rubber which comprises applying and drying a coating of hard rubber cement on the surface of the article, applying and drying a coating of intermediate rubber cement over the hard rubber, applying a coating of rubber latex over the intermediate rubber, depositing solid constituents of the latex on the article, and vulcanizing.

4. The process of permanently coating metal with rubber which comprises applying a coating of hard rubber cement to the surface of a metal, drying the hard rubber cement, applying a coating of intermediate rubber cement over the hard rubber, drying the intermediate rubber cement, applying a compounded rubber latex over the intermediate rubber, coagulating the latex to cause the deposition of solid constituents therefrom, and vulcanizing.

5. The process of permanently coating metal with rubber which comprises applying a coating of hard rubber cement to the surface of the metal, drying the hard rubber cement, applying a coating of intermediate rubber cement over the hard rubber, drying the intermediate rubber cement, dipping the coated surface into a water dispersion of rubber and compounding ingredients to form a film of the dispersion over the intermediate rubber, coagulating the dispersion to cause the deposition of solid constituents of the dispersion on the intermediate rubber, and vulcanizing.

6. The process of permanently coating hollow articles with rubber, which comprises filling the article with hard rubber cement and emptying to form a film of hard rubber cement over the surface to be coated, drying the film of hard rubber cement, filling the article with an intermediate rubber cement and emptying to form a film of intermediate rubber cement over the hard rubber, drying the film of intermediate rubber cement, filling the article with a water dispersion of rubber and emptying to form a film of the dispersion over the intermediate rubber, filling the article with a coagulating medium and emptying to cause the deposition of solid constituents of the dispersion, and vulcanizing.

7. The process of permanently coating hollow articles with rubber, which comprises filling the article with hard rubber cement and emptying to form a film of hard rubber cement over the surface to be coated, drying the film of hard rubber cement, filling the article with an intermediate rubber cement and emptying to form a film of intermediate rubber cement over the hard rubber, drying the film of intermediate rubber cement, filling the article with a water dispersion of rubber and emptying to form a film of the dispersion over the intermediate rubber, filling the article with a coagulating medium and emptying to cause the deposition of solid constituents of the dispersion, refilling the article with the water dispersion of rubber and maintaining the dispersion in the article a sufficient length of time to permit the formation of a deposit of solid constituents of the dispersion of the desired thickness, emptying the dispersion from the article, and vulcanizing.

8. The process of permanently coating hollow articles with rubber, which comprises filling the article with hard rubber cement and emptying to form a film of hard rubber cement over the surface to be coated, drying the film of hard rubber cement, filling the article with an intermediate rubber cement and emptying to form a film of intermediate rubber cement over the hard rubber, drying the film of intermediate rubber cement, filling the article with compounded rubber latex and emptying to form a film of the latex over the intermediate rubber, filling the article with a coagulating medium and emptying to cause the deposition of solid constituents of the latex, refilling the article with the latex and maintaining the latex in the article a sufficient length of time to permit the formation of a deposit of solid constituents of the latex of the desired thickness, emptying the latex from the article, passing the coagulating medium through the article, and vulcanizing.

9. The process of permanently coating hollow articles which comprises alternately applying a hard rubber cement and drying until the desired thickness of coating is obtained, alternately applying an intermediate rubber cement and drying until the desired thickness of coating is obtained, alternately applying rubber latex and depositing solids therefrom until the desired thickness of coating is obtained, and vulcanizing.

10. An article having a permanent coat of compounded rubber consisting of a layer of hard rubber in contact with the surface of the article, a layer of intermediate rubber in contact with the hard rubber, and an in-situ deposit of rubber from chemically coagulated latex over the layer of intermediate rubber.

11. An article having a permanent coating of compounded rubber consisting of a layer of hard rubber in contact with the surface of the article, a layer of intermediate rubber in contact with the hard rubber, and a layer of rubber deposited from a water dispersion of rubber and compounding ingredients over the layer of intermediate rubber.

12. An article comprising a metallic member, a superposed layer of metal-to-rubber adhesive, and an in-situ deposit of rubber from chemically coagulated latex thereon.

13. An article comprising a metallic member, a superposed layer of metal-to-rubber adhesive, and an in-situ deposit of rubber from acid coagulated latex thereon.

14. An article comprising a metallic member, a superposed layer of metal-to-rubber adhesive, and an in-situ deposit of rubber from an aqueous dispersion of rubber thereon.

15. An article comprising a metallic member, a superposed layer of metal-to-rubber adhesive, and a coating of grainless rubber derived from an aqueous dispersion of rubber over said adhesive.

16. The process of permanently coating metal with rubber, which comprises applying a coating of metal-to-rubber adhesive on the surface of the metal, applying an aqueous dispersion of rubber to said adhesive, and depositing solid constituents from said dispersion.

17. The process of permanently coating metal with rubber, which comprises applying a coating of metal-to-rubber adhesive on the surface of the metal, applying an aqueous dispersion of rubber to said adhesive, and chemically coagulating the dispersion to cause the deposition of solid constituents of the dispersion on said adhesive.

18. The process of permanently coating metal with rubber, which comprises applying a coating of metal-to-rubber adhesive on the surface of the metal, applying an aqueous dispersion of rubber to said adhesive, and coagulating the dispersion with acid to cause the deposition of solid constituents of the dispersion on said adhesive.

Signed at Naugatuck, county of New Haven, State of Connecticut, this 15th day of September, 1928.

PARKE H. WATKINS.

DISCLAIMER 1,896,263.—*Parke H. Watkins*, Naugatuck, Conn. RUBBER COATED ARTICLES AND PROCESS. Patent dated February 7, 1933. Disclaimer filed February 15, 1934, by the assignee, *The Naugatuck Chemical Company*.

Hereby enters this disclaimer to that part of the claim in said specification which is in the following words, to wit:

"14. An article comprising a metallic member, a superposed layer of metal-to-rubber adhesive, and an in-situ deposit of rubber from an aqueous dispersion of rubber thereon.

"15. An article comprising a metallic member, a superposed layer of metal-to-rubber adhesive, and a coating of grainless rubber derived from an aqueous dispersion of rubber over said adhesive.

"16. The process of permanently coating metal with rubber, which comprises applying a coating of metal-to-rubber adhesive on the surface of the metal, applying an aqueous dispersion of rubber to said adhesive, and depositing solid constituents from said dispersion."

[*Official Gazette March 6, 1934.*]